(12) United States Patent
Wucherer et al.

(10) Patent No.: US 12,370,528 B2
(45) Date of Patent: Jul. 29, 2025

(54) CATALYST-CONTAINING MATERIAL

(71) Applicant: AEROJET ROCKETDYNE, INC., Sacramento, CA (US)

(72) Inventors: Edward Wucherer, Woodinville, WA (US); Benjamin Andrew Glassy, Kirkland, WA (US)

(73) Assignee: AEROJET ROCKETDYNE, INC., Melbourne, FL (US)

( * ) Notice: Subject to any disclaimer, the term of this patent is extended or adjusted under 35 U.S.C. 154(b) by 588 days.

(21) Appl. No.: 17/775,652

(22) PCT Filed: Nov. 25, 2019

(86) PCT No.: PCT/US2019/062943
§ 371 (c)(1),
(2) Date: May 10, 2022

(87) PCT Pub. No.: WO2021/107913
PCT Pub. Date: Jun. 3, 2021

(65) Prior Publication Data
US 2022/0410125 A1     Dec. 29, 2022

(51) Int. Cl.
*B01J 21/06*     (2006.01)
*B01J 23/10*     (2006.01)
(Continued)

(52) U.S. Cl.
CPC ............ *B01J 21/066* (2013.01); *B01J 23/10* (2013.01); *B01J 23/22* (2013.01); *B01J 23/34* (2013.01);
(Continued)

(58) Field of Classification Search
CPC . B01J 21/066; B01J 23/10; B01J 23/22; B01J 23/34; B01J 23/468; B01J 37/0018; B01J 37/0063; B01J 37/08; B01J 2523/3712; B01J 2523/49; B01J 2523/55; B01J 2523/72; B01J 2523/827;
(Continued)

(56) References Cited

U.S. PATENT DOCUMENTS

2006/0052233 A1* 3/2006 Beeckman ............... B01J 29/40
                                                                 502/64
2012/0304620 A1 12/2012 Masse et al.
(Continued)

FOREIGN PATENT DOCUMENTS

JP    2011224428 A   * 11/2011

OTHER PUBLICATIONS

Nicholas A. Strange, Sourav Adak, Zachary Stroupe, Christopher A. Crain, Eric C. Novak, Luke L. Daemen, and J. Z. Larese, A multi-faceted structural, thermodynamic, and spectroscopic approach for investigating ethanol dehydration over transition phase aluminas, 2023, Phys. Chem. Chem. Phys., 25 (Year: 2023).*
(Continued)

*Primary Examiner* — Daniel C. McCracken
*Assistant Examiner* — Joshua Maxwell Speer
(74) *Attorney, Agent, or Firm* — Carlson, Gaskey & Olds, P.C.

(57) ABSTRACT

A catalyst-containing material includes a refractory matrix and particles of one or more catalytic metal elements or catalytic oxides. The particles are dispersed through, and embedded in, the refractory matrix.

14 Claims, 2 Drawing Sheets

(51) Int. Cl.
  *B01J 23/22* (2006.01)
  *B01J 23/34* (2006.01)
  *B01J 23/46* (2006.01)
  *B01J 37/00* (2006.01)
  *B01J 37/08* (2006.01)

(52) U.S. Cl.
  CPC ......... *B01J 23/468* (2013.01); *B01J 37/0018* (2013.01); *B01J 37/0063* (2013.01); *B01J 37/08* (2013.01); *B01J 2523/3712* (2013.01); *B01J 2523/49* (2013.01); *B01J 2523/55* (2013.01); *B01J 2523/72* (2013.01); *B01J 2523/827* (2013.01)

(58) Field of Classification Search
  CPC ........ B01J 23/63; B01J 37/0201; B01J 37/04; B01J 37/088; B01J 37/009; F02K 9/94
  See application file for complete search history.

(56) References Cited

U.S. PATENT DOCUMENTS

| | | | |
|---|---|---|---|
| 2016/0016152 A1 | 1/2016 | Savrun | |
| 2018/0169626 A1* | 6/2018 | Kadota | B01J 35/57 |
| 2020/0254432 A1* | 8/2020 | Shirman | B01J 23/74 |

OTHER PUBLICATIONS

Issam Mjejri, Aline Rougier, and Manuel Gaudon, Low-Cost and Facile Synthesis of the Vanadium Oxides V2O3, VO2, and V2O5 and Their Magnetic, Thermochromic and Electrochromic Properties, Jan. 24, 2017, Inorg. Chem. 56, 1734-1741 (Year: 2017).*
International Search Report for International Application No. PCT/US2019/062943 mailed Aug. 10, 2020.
International Preliminary Report on Patentability for International Application No. PCT/US2019/062943 mailed Jun. 9, 2022.

* cited by examiner

CATALYST-CONTAINING MATERIAL

BACKGROUND

This disclosure relates to catalyst architectures and compositions that are useful in a variety of applications, such as thrusters.

Catalysts are known and used in a variety of architectures and compositions to facilitate many different chemical reactions. For instance, platinum group metals are often used as catalysts in supported catalyst architectures. Example architectures include catalyst powders that are attached to the outer surface of a core support particle and catalysts that are infiltrated into porous high surface area supports.

SUMMARY

A catalyst-containing material according to an example of the present disclosure includes a refractory matrix and particles of one or more catalytic metal elements or catalytic oxides. The particles are dispersed through, and embedded in, the refractory matrix.

In a further embodiment of any of the foregoing embodiments, the particles are of the one or more catalytic metal elements and are selected from Ir, Pt, Pd, Rh, Os, Ru, Re, and combinations thereof.

In a further embodiment of any of the foregoing embodiments, the one or more catalytic metal elements are Ir.

In a further embodiment of any of the foregoing embodiments, the particles are of the catalytic oxides and are selected from as $V_2O_5$, $MnO_2$, and combinations thereof.

In a further embodiment of any of the foregoing embodiments, the refractory matrix is an oxide selected from $CeO_2$, $HfO_2$, $ZrO_2$, $Y_2O_3$, $Ln_2O_3$, where Ln is a lanthanide element, and combinations thereof.

In a further embodiment of any of the foregoing embodiments, the refractory matrix is an oxide selected from $CeO_2$, $HfO_2$, and combinations thereof.

In a further embodiment of any of the foregoing embodiments, the refractory matrix is selected from refractory metals and ceramic refractories.

In a further embodiment of any of the foregoing embodiments, including, by weight, 5% to 50% of the particles of one or more catalytic metal elements and 95% to 50% of the ceramic oxide matrix.

In a further embodiment of any of the foregoing embodiments, by weight, 30% to 40% of the metallic particles of one or more catalytic metal elements or catalytic oxides, and 70% to 60% of the refractory matrix.

In a further embodiment of any of the foregoing embodiments, the refractory matrix is a binary composition of two different oxides selected from $CeO_2$, $HfO_2$, $ZrO_2$, $Y2O_3$, and $Ln_2O_3$, where Ln is a lanthanide element.

In a further embodiment of any of the foregoing embodiments, the refractory matrix is a binary composition of $CeO_2$ and $HfO_2$.

In a further embodiment of any of the foregoing embodiments, the particles are of the one or more catalytic metal elements and are selected from Ir, Pt, Pd, Rh, Os, Ru, Re, and combinations thereof, the refractory matrix is an oxide selected from $CeO_2$, $HfO_2$, $ZrO_2$, $Y_2O_3$, $La_2O_3$, and combinations thereof, and including, by weight, 5% to 50% of the particles of the one or more catalytic metal elements or the catalytic oxides, and 95% to 50% of the refractory matrix.

In a further embodiment of any of the foregoing embodiments, the particles are of the one or more catalytic metal elements and are Ir, the refractory matrix is an oxide selected from $CeO_2$, $HfO_2$, and combinations thereof, and including, by weight, 30% to 40% of the particles of the one or more catalytic metal elements or the catalytic oxides, and 70% to 60% of the refractory matrix.

In a further embodiment of any of the foregoing embodiments, the material consists of: the particles are of the one or more catalytic metal elements and are Ir, the refractory matrix is an oxide selected from the group consisting of $CeO_2$, $HfO_2$, and combinations thereof, and including, by weight, 30% to 40% of the particles of the one or more catalytic metal elements and 70% to 60% of the refractory matrix.

In a further embodiment of any of the foregoing embodiments, a thruster includes a combustion chamber, an injector for providing propellant into the combustion chamber, and the catalyst-containing material, as in any of the foregoing embodiments, disposed in the combustion chamber for catalyzing reaction of the propellant.

A method of fabricating a catalyst-containing material according to an example of the present disclosure includes providing a mixture of matrix particles and particles of one or more catalytic metal elements or catalytic oxides, combining the mixture with at least a binder to produce one or more green state bodies, and thermally treating the one or more green state bodies. The thermal treatment causes a sintering of the matrix particles to produce a refractory matrix with the particles of the one or more catalytic metal elements or the catalytic oxides dispersed through, and embedded in, the refractory matrix.

A further embodiment of any of the foregoing embodiments includes granulating the one or more green state bodies.

In a further embodiment of any of the foregoing embodiments, the particles are of the one or more catalytic metal elements and are selected from Ir, Pt, Pd, Rh, Os, Ru, Re, and combinations thereof.

In a further embodiment of any of the foregoing embodiments, the particles are ceramic oxide particles selected from $CeO_2$, $HfO_2$, $ZrO_2$, $Y2O_3$, $Ln_2O_3$ where Ln is a lanthanide element, and combinations thereof.

A thruster according to an example of the present disclosure includes a combustion chamber, an injector for providing propellant into the combustion chamber, an exit for discharging decomposition products from the combustion chamber, and a catalyst-containing material in the combustion chamber for catalyzing reaction of the propellant. The ceramic matrix catalyst composite include a refractory matrix, and particles of one or more catalytic metal elements or catalytic oxides embedded in, and dispersed through, the refractory matrix.

In a further embodiment of any of the foregoing embodiments, the particles are of the one or more catalytic metal elements and are selected from Ir, Pt, Pd, Rh, Os, Ru, Re, and combinations thereof, the refractory matrix is an oxide selected from $CeO_2$, $HfO_2$, $ZrO_2$, $Y_2O_3$, $Ln_2O_3$ where Ln is a lanthanide element, and combinations thereof, and including, by weight, 5% to 50% of the particles of the one or more catalytic metal elements or the ceramic oxides, and 95% to 50% of the refractory matrix.

In a further embodiment of any of the foregoing embodiments, the particles are of the one or more catalytic metal elements and are Ir, the refractory matrix is an oxide selected from $CeO_2$, $HfO_2$, and combinations thereof, and including, by weight, 30% to 40% of the particles of the one or more catalytic metal elements or the catalytic oxides and 70% to 60% of the refractory matrix.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

In some high-temperature applications, such as in thrusters, and even some lower temperature applications, the catalyst of a supported catalyst may pool or migrate into agglomerates that reduce catalytic effectiveness. These supported catalysts thus exhibit relatively low durability in terms of maintaining catalytic effectiveness. The common thinking on catalyst architecture has, at least in part, likely also hampered resolution of this problem. For instance, in the architecture of a typical supported catalyst, the paradigm is that all of the catalyst is exposed in order to maximize contact with the reactant(s). Therefore, over the same time period all of the catalyst may be continuously susceptible to pooling or migration. In this regard, disclosed herein is a ceramic matrix catalyst composite to facilitate improved durability.

Figure 1:
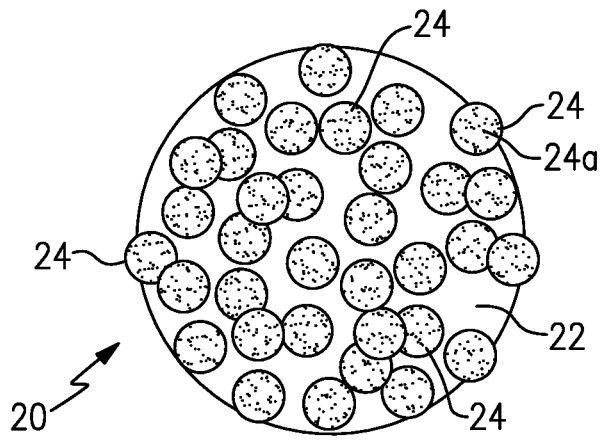
FIG. 1 illustrates a sectioned view of a catalyst-containing material.

FIG. 1 illustrates a sectioned view of an example of a catalyst-containing material 20 (hereafter "material 20"). As shown, the material 20 is in the form of a granule. Such granules can be provided in a catalyst bed to contact reactant(s), for example. It is to be appreciated, however, that the material 20 is not limited to granules and that the material 20 may be provided in other forms as end uses dictate, such as but not limited to cylinders, rods, or other engineered shapes.

The material 20 includes a refractory matrix 22 and particles 24 (only a few of which are numbered in the figure). The particles 24 are composed of one or more catalytic metal elements or catalytic oxides (generally shown at 24a), and the particles 24 are dispersed through, and embedded in, the refractory matrix 22. For example, the particles 24 are composed of only the catalytic metal elements or catalytic oxides 24a. The term "dispersed" refers to the particles 24 being relatively uniformly spatially distributed through the extent of the refractory matrix 22. The term "embedded" refers to the particles 24 being securely implanted in the refractory matrix 22, such as by being substantially or fully surrounded by, and in intimate contact with, the refractory matrix 22. With such embedding, the metallic particles 24 are "locked" into the refractory matrix 22, unlike a supported catalyst in which the catalyst is merely deposited into an already existing pore in a support.

The refractory matrix 22 is composed of one or more refractories. As used herein, a "refractory" or "refractories" refers to one or more high temperature materials selected from among two material classifications, including those known as refractory materials and refractory metals. Refractory materials are understood to be non-metallic materials, such as many ceramics, that have chemical and physical properties that make the material applicable for use in environments above 1,000° F. (538° C.). Refractory metals are understood to be niobium, molybdenum, tantalum, tungsten, rhenium, titanium, vanadium, chromium, zirconium, hafnium, ruthenium, rhodium, osmium, and iridium.

In one example, the refractory matrix 22 is monolithic and is thus composed of only one of the above refractories, such as a single metallic element or a single refractory compound. In another example, the refractory matrix 22 is a composite and is thus composed of two or more of the above refractories. In further examples, the refractory matrix 22 also has one or more refractories that are provided as reinforcement and are distributed through the refractory matrix 22 (but that are different than the catalytic metal elements 24a that are dispersed in the refractory matrix 22). As an example, the reinforcement refractory includes fibers or fiber networks formed of a refractory or refractories that are chemically dissimilar to the refractory or refractories of the refractory matrix 22. For instance, in one non-limiting example, the refractory reinforcement is zirconium fibers and the refractory matrix 22 is selected from the refractories above but does not contain any zirconium.

Ceramics refractories include, but are not limited to, refractory borides, nitrides, carbides, and oxides. "Ceramic" refers generally to inorganic non-metallic solid compounds, usually having one or more metal or metalloid elements bonded with boron, nitrogen, carbon, oxygen, or combinations of these and which may be crystalline, partially crystalline, or non-crystalline. Examples include, but are not limited to, $TiB_2$, $NbB_2$, $Si_3N_4$, and SiC. Example ceramic oxides are selected from $CeO_2$, $HfO_2$, $ZrO_2$, $Y_2O_3$, and $Ln_2O_3$, where Ln is a lanthanide element selected from La, Nd, Eu, Tb, Er, and Yb.

An example catalytic metal element or elements 24a of the particles 24 are selected from Ir, Pt, Pd, Rh, Os, Ru, Re, and combinations thereof. In one particular example, the refractory matrix 22 is selected from $CeO_2$, $HfO_2$, or combinations thereof and the catalytic metal is Ir. In a further example, the refractory matrix 22 may also include other ceramic oxides, and the catalytic metal may also include other metals. In further examples, however, the refractory matrix 22 consists only of $CeO_2$, $HfO_2$, or combinations thereof and the catalytic metal consists only of Ir such that the material 20 is composed only of Ir and $CeO_2$, $HfO_2$, or combinations thereof. In further examples the metal element in the above examples is substitute out for a catalytic oxide, such as $V_2O_5$ or $MnO_2$.

The relative amounts of the refractory matrix 22 and the particles 24 may be varied for catalytic effect. Most typically, the amounts will be, by combined weight of the matrix 22 and the particles 24, 5% to 50% by weight of the particles 24 and 95% to 50% by weight of the refractory matrix 22. In a further example, the amounts are 30% to 40% by weight of the particles 24 and 70% to 60% by weight of the refractory matrix 22. In the example amounts above it is assumed that the material 20 is composed only of the ceramic oxide matrix 22 and the particles 24. If the material 20 does have other constituents, the same amounts as above may be used relative to the combined weight of only the matrix 22 and the particles 24 (i.e., excluding the weight of other constituents).

The architecture of the material 20 having the particles 24 dispersed through, and embedded in, the refractory matrix 22 facilitates the mitigation of pooling or migration. For instance, as shown in FIG. 1, some of the particles 24 are initially located near the outer surface of the material 20 (e.g., the exterior surface of the granule in this case), with at least a portion of those particles 24 being exposed at the outer surface of the refractory matrix 22. Others of the particles 24 are situated below the outer surface, and are not exposed.

The particles 24 that are exposed can come into contact with the reactant(s) and thus participate in the catalytic reaction with the reactant(s). The refractory matrix 22 blocks or substantially blocks the particles 24 that are below the outer surface from contact with the reactant(s). The particles 24 that are below the outer surface are thus dormant and do not or do not substantially participate in catalytic reactions.

Figure 2:
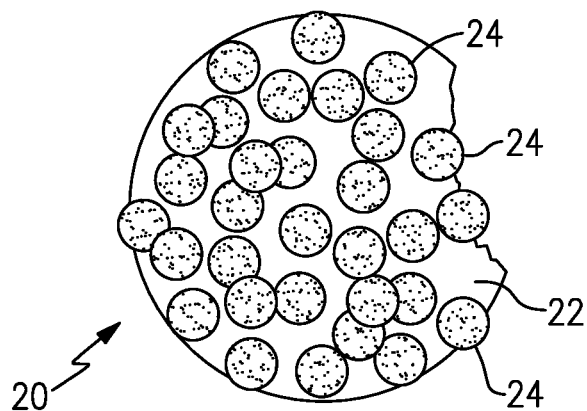
FIG. 2 illustrates a sectioned view of the catalyst-containing material after a period of use.

With time and use the particles 24 that are exposed may pool or migrate. In the material 20, however, the movement of the initially exposed particles 24 due to pooling or migration reveals another particle 24 thereunder to be exposed. FIG. 2 illustrates the particle 24 after migration of several of the original particles 24 that were initially at the surface, with the particle 24 underneath now newly exposed. The newly exposed particle 24 is then able to come into direct open contact with the reactant(s) and can thus participate in the catalytic reactions.

With further time and use, the particle 24 that became exposed by the movement of the particle above it may itself pool or migrate to a new location, thereby revealing a next particle 24 underneath it, and so on and so forth. In this manner, the material 20 in essence "self-replaces" particles 24 that are lost due to pooling or migration, thereby making up the lost catalytic effect of the pooled/migrated particles 24 with the catalytic effect of newly exposed particles 24.

Figure 3:
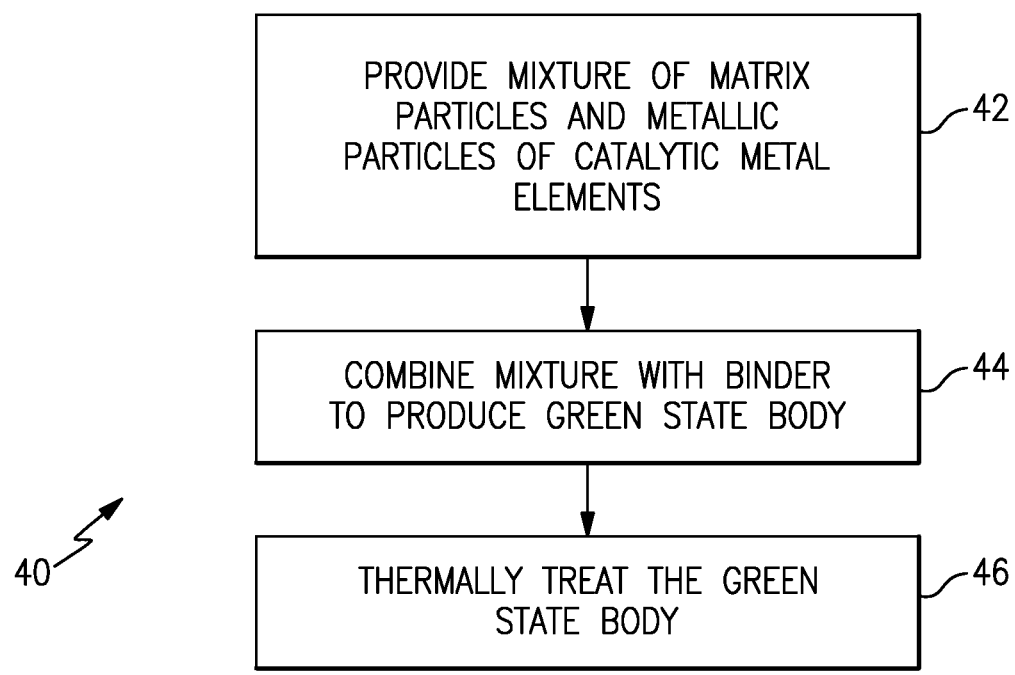
FIG. 3 illustrates a method of fabricating a catalyst-containing material.

FIG. 3 depicts an example method 40 of fabricating the material 20. The method 40 includes steps 42, 44, and 46. Although the steps are shown in separate blocks, it is to be understood that the steps represent actions or functions which may be combined, further divided into sub-steps, and/or used with other method steps.

At step 42, a mixture of matrix particles and particles 24 is provided. The mixture may be provided as a pre-prepared mixture or alternatively may be prepared from starting materials. For the later, starting matrix particles are mixed with starting particles 24. If the matrix particles contain more than one composition of particles, this may also involve mixing together multiple compositions of the matrix particles. Likewise, if the particles 24 contain more than one composition, the multiple compositions are mixed together. The order of mixing is not particularly noteworthy, and the starting materials may be mixed all at once or in two or more sub-mixtures that are then combined into a final mixture.

The starting matrix particles and the starting particles 24 will most typically be dry powders. For example, for ease of processing, the starting matrix particles are provided as a powder of the refractory that is to form the refractory matrix 22 such that no chemical conversion of the starting matrix particles is required. Additionally, using the powder of the refractory eliminates having to conduct chemical conversions. The character of the dry powders is not particularly noteworthy, but in general the matrix powder particles and the particles 24 will, on average, each have a size of less than 100 micrometers, with one further example being 5 to 30 micrometers. The powders are mixed in percentage ratios by weight that correspond to the desired percentages in the material 20. In this regard, the powders are mixed in accordance with the percentages described above for the refractory matrix 22 and the particles 24 in the material 20. Various known techniques for mixing may be used. One example technique includes combining the dry powders and then mixing using an oscillating shaker (sometimes known as a "paint shaker").

At step 44 the mixture is combined with at least a binder to produce a green state body. Most typically, the binder will be a polymer or resin, but other types of binders may alternatively be used, depending on the desired form of the green state body and additional processing steps. One example useful binder is polyvinyl butyral resin, with one such example being Butvar® B-79.

A solvent may be added to soften the binder and make the green state body more formable. For example, the solvent is one or more organic solvents, such as but not limited to, isopropanol, methanol, or ethanol. In one example, an amount of solvent is added such that the green state body is a thick paste. For instance, the paste is readily formable but self-supporting so as to hold a formed shape. In most instances, the green state body will be formed into a shape or shapes that are desired for or relate to the end use. For instance, the forming may include, but is not limited to, extruding, molding, pressing, stamping, cutting, and dividing. In one particular example, the green state body is extruded and then granulated by cutting or dividing into granules (i.e., granular green state bodies).

At step 46, the green state body (or bodies, if applicable) are thermally treated. The thermal treatment causes sintering of the matrix particles to produce the refractory matrix 22. The binder and any residual solvent also burn off. The particles 24 that were mixed with the matrix particles thereby become embedded in the refractory matrix 22. The sintering is a solid state thermal process in which the matrix particles fuse into a solid body without melting the matrix particles. The temperature, environment, and pressure of the sintering may be varied in accordance with the composition of the refractory. Most typically, the sintering will be conducted at a temperature that is substantially less than the melting temperature of the refractory and in a cover gas that is inert with regard to reaction with the ceramic oxide or alternatively a reactive gas to prompt chemical conversions. Sintering temperatures vary, but are generally 40% to 70% of the melting temperature. Moreover, the sintering may be conducted in accordance with a heating profile, to control heating rate, cooling rate, hold time, and/or temperature cycling. An air or oxygen environment may be used to mitigate oxide loss of the ceramic.

During the sintering, the matrix particles fuse together, trapping the particles 24 in the refractory matrix 22. As sintering is primarily a solid state mass transport phenomenon, it is expected that there will be minimal chemical reactions during the process. Therefore, in the case where the dry starting powder compositions are the compositions that are selected for the compositions of the refractory matrix 22 and the particles 24, the compositions of the refractory matrix 22 and the particles 24 are expected to be equal to the compositions of the dry starting powders. It may be possible, however, that constituents of the dry starting powders react to produce a new, different composition or phase in the refractory matrix 22.

After sintering, the resulting consolidated material 20 is ready for use or may be subjected to additional processing steps depending on the end use. Comparison methods for depositing catalyst on the surface of a support typically involve use of metal salts that require steps to reduce the metal (e.g., Ir salts to Ir metal). The method 40 avoids use of such salts and thereby reduces the required steps and processing time. The following working examples further demonstrate the method 40.

EXAMPLE 1

Ceramic oxide catalyst composite: $HfO_2/CeO_2$ nominal 9 wt % Ir.

Dry powder of 0.5 grams of Ir, 4.59 grams of $HfO_2$, 0.41 grams of $CeO_2$, and 0.21 grams of B-79 were combined and mixed for 15 minutes in an oscillating shaker. A volume of 1.05 milliliters of isopropanol was then added and the mixing was continued for 30 more minutes. The resulting mixture had the consistency of a thick paste. The paste was then extruded into "noodles" and dried overnight. The dried noodles were then pressed through a size 20 mesh sieve to produce granular green state bodies. The granular green state bodies were sintered in an air environment with a heating rate of 150° C./hr to 1700° C., held at temperature for 10 hours, and then cooled at a rate of −150° C./hr to less than 100° C. The resulting granules contained a $HfO_2/CeO_2$ alloy and Ir metal as indicated by X-ray diffraction analysis.

EXAMPLE 2

Ceramic oxide catalyst composite: $HfO_2/CeO_2$ nominal 20 wt % Ir.

Dry powder of 1.0 grams of Ir, 3.68 grams of $HfO_2$, 0.33 grams of $CeO_2$, and 0.16 grams of B-79 were combined and mixed for 15 minutes in an oscillating shaker. A volume of 1.68 milliliters of isopropanol was then added and the mixing was continued for 15 more minutes. The mixture was runny. Nitrogen gas was blown through the mixture to remove isopropanol until a paste was obtained. The paste was then extruded into "noodles," dried, and then pressed through a size 20 mesh sieve to produce granular green state bodies. The granular green state bodies were sintered in an air environment with a heating rate of 150° C./hr to 1700° C., held at temperature for 10 hours, and then cooled at a rate of −150° C./hr to less than 100° C.

EXAMPLE 3

Ceramic oxide catalyst composite: $HfO_2/CeO_2$ nominal 30 wt % Ir.

Dry powder of 1.5 grams of Ir, 3.2 grams of $HfO_2$, 0.3 grams of $CeO_2$, and 0.14 grams of B-79 were combined and mixed for 15 minutes in an oscillating shaker. A volume of 0.74 milliliters of isopropanol was then added and the mixing was continued for 15 more minutes. The mixture was still powdery at that point. An additional volume of 0.07 milliliters was added and mixing was continued for 5 more minutes. This was repeated until the mixture had a consistency of a thick paste. The paste was then extruded into "noodles," dried, and then pressed through a size 20 mesh sieve to produce granular green state bodies. The granular green state bodies were sintered in an air environment with a heating rate of 150° C./hr to 1700° C., held at temperature for 10 hours, and then cooled at a rate of −150° C./hr to less than 100° C.

EXAMPLE 4

Ceramic oxide catalyst composite: $HfO_2/CeO_2$ nominal 40 wt % Ir.

Dry powder of 65.47 grams of Ir (pre-sieved to −325 mesh), 89.94 grams of $HfO_2$, 8.18 grams of $CeO_2$, and 3.92 grams of B-79 were combined and mixed for 15 minutes in an oscillating shaker. A volume of 20.60 milliliters of isopropanol was then added and the mixing was continued for 15 minutes. The mixture appeared slightly dry so an additional 3 milliliters of isopropanol was then added and the mixing was continued for 30 more minutes. The resulting mixture had the consistency of a thick paste. The paste was then extruded into "noodles," dried, and then pressed through a size 20 mesh sieve to produce granular green state bodies. The granular green state bodies were sintered in an air environment with a heating rate of 150° C./hr to 1700° C., held at temperature for 10 hours, and then cooled at a rate of −150° C./hr to less than 100° C. A further reduction step was employed to reduce any potential surface oxide on the accessible iridium metal.

Figure 4:
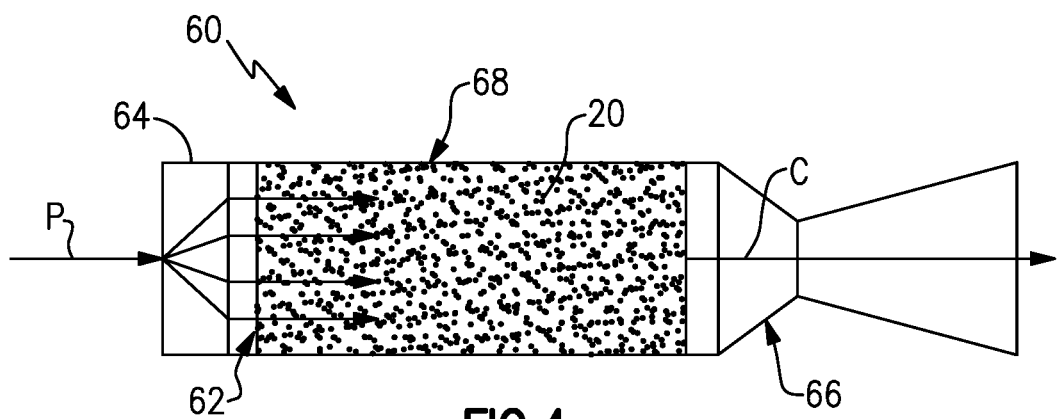
FIG. 4 illustrates an example thruster that has a catalyst-containing material.

FIG. 4 illustrates an example implementation of the material 20. In this example, the material 20 is in a thruster 60. The thruster 60 includes a combustion chamber 62, an injector 64 for providing propellant P into the combustion chamber 62, and an exit 66 for discharging decomposition gases C from the combustion chamber 62. In this example, the exit 66 is a nozzle but can alternatively be an orifice or other type of exit. The material 20 is disposed in the combustion chamber 62 as a catalyst bed 68. The propellant P is introduced into the combustion chamber 62 via the injector 64. The catalyst bed 68 serves to facilitate ignition and decomposition of the propellant. The propellant is typically liquid and may be, but is not limited to, ionic liquid monopropellants, hydrazine-based propellant blends, triazole-based propellant blends, peroxide-based propellant, and carbohydrazide-based propellant blends. The decomposition products are ejected through the exit 66 to produce thrust.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A catalyst-containing material comprising:
a refractory matrix; and
particles of one or more catalytic metal elements, the particles being dispersed through, and embedded in, the refractory matrix, wherein the particles of one or more catalytic metal elements include Ir, the refractory matrix includes one or more oxides selected from $CeO_2$, $HfO_2$, and combinations thereof, and including, by weight, 30% to 40% of the particles of the one or more catalytic metal elements, and 70% to 60% of the refractory matrix.

2. The catalyst-containing material as recited in claim 1, wherein the particles of one or more catalytic metal elements additionally include one or more metals selected from Pt, Pd, Rh, Os, Ru, Re, and combinations thereof.

3. The catalyst-containing material as recited in claim 1, wherein the particles of one or more catalytic metal elements additionally include one or more catalytic oxides selected from as $V_2O_5$, $MnO_2$, and combinations thereof.

4. The catalyst-containing material as recited in claim 1, wherein the refractory matrix additionally includes one or more oxides selected from $ZrO_2$, $Y_2O_3$, $Ln_2O_3$, where Ln is a lanthanide element, and combinations thereof.

5. The catalyst-containing material as recited in claim 1, wherein the refractory matrix is a binary composition of $CeO_2$ or $HfO_2$, and an oxide selected from $ZrO_2$, $Y_2O_3$, and $Ln_2O_3$, where Ln is a lanthanide element.

6. The catalyst-containing material as recited in claim 1, wherein the refractory matrix is a binary composition of $CeO_2$ and $HfO_2$.

7. The catalyst-containing material as recited in claim 1, consisting of: the particles of the Ir and the refractory matrix of one or more oxides selected from $CeO_2$, $HfO_2$, and combinations thereof.

8. A thruster including a combustion chamber, an injector for providing propellant into the combustion chamber, and the catalyst-containing material of claim 1 disposed in the combustion chamber for catalyzing reaction of the propellant.

9. A method of fabricating a catalyst-containing material, the method comprising:
providing a mixture of matrix particles and particles of one or more catalytic metal elements;
combining the mixture with at least a binder to produce one or more green state bodies;
thermally treating the one or more green state bodies, the thermal treatment causing a sintering of the matrix particles to produce a refractory matrix with the particles of the one or more catalytic metal elements or the catalytic oxides dispersed through, and embedded in, the refractory matrix, wherein the particles of one or more catalytic metal elements include Ir, the refractory matrix includes one or more oxides selected from $CeO_2$, $HfO_2$, and combinations thereof, and including, by weight, 30% to 40% of the particles of the one or more catalytic metal elements, and 70% to 60% of the refractory matrix.

10. The method as recited in claim 9, further comprising granulating the one or more green state bodies.

11. The method as recited in claim 9, wherein the particles of the one or more catalytic metal elements additionally include one or more metals selected from Pt, Pd, Rh, Os, Ru, Re, and combinations thereof.

12. The method as recited in claim 9, wherein the matrix particles additionally include one or more oxides selected from $ZrO_2$, $Y2O_3$, $Ln_2O_3$ where Ln is a lanthanide element, and combinations thereof.

13. A thruster comprising:
a combustion chamber;
an injector for providing propellant into the combustion chamber;
an exit for discharging decomposition products from the combustion chamber; and
a catalyst-containing material in the combustion chamber for catalyzing reaction of the propellant, the catalyst-containing material including
a refractory matrix; and
particles of one or more catalytic metal elements dispersed through, and embedded in, the refractory matrix, wherein the particles of one or more catalytic metal elements include Ir, the refractory matrix includes one or more oxides selected from $CeO_2$, $HfO_2$, and combinations thereof, and including, by weight, 30% to 40% of the particles of the one or more catalytic metal elements, and 70% to 60% of the refractory matrix.

14. The thruster as recited in claim 13, wherein the particles of the one or more catalytic metal elements additionally include one or more metals selected from Pt, Pd, Rh, Os, Ru, Re, and combinations thereof, the refractory matrix additionally includes an oxide selected from $ZrO_2$, $Y2O_3$, $Ln_2O_3$ where Ln is a lanthanide element, and combinations thereof.

* * * * *